United States Patent [19]
Hauenstein et al.

[11] Patent Number: 5,708,084
[45] Date of Patent: Jan. 13, 1998

[54] ORGANIC POLYMERS MODIFIED WITH SILICONE MATERIALS

[75] Inventors: Dale Earl Hauenstein; Caibao Qian; David Joseph Romenesko, all of Midland, Mich.

[73] Assignee: Dow Corning Corporation, Midland, Mich.

[21] Appl. No.: 703,160

[22] Filed: Aug. 28, 1996

[51] Int. Cl.$^6$ ........................................... C08L 83/04
[52] U.S. Cl. .................. 525/102; 575/105; 575/106; 575/431; 575/446; 524/267; 524/269
[58] Field of Search .................... 525/106, 100, 525/105, 102, 446, 431; 524/267, 269

[56] References Cited

U.S. PATENT DOCUMENTS

| | | | |
|---|---|---|---|
| 2,930,083 | 3/1960 | Vostovich | 18/55 |
| 3,865,897 | 2/1975 | Falender et al. | 525/106 |
| 4,265,801 | 5/1981 | Moody | 260/40 R |
| 4,535,113 | 8/1985 | Foster | 524/262 |
| 4,616,064 | 10/1986 | Zulosky et al. | 525/92 |
| 4,666,772 | 5/1987 | Schinkel | 428/330 |
| 4,692,386 | 9/1987 | Schinkel | 428/515 |
| 4,857,593 | 8/1989 | Leung et al. | 525/92 |
| 5,034,278 | 7/1991 | Turbett | 428/450 |
| 5,120,888 | 6/1992 | Nohr et al. | 524/99 |
| 5,356,585 | 10/1994 | Romenesko | 264/211 |

FOREIGN PATENT DOCUMENTS

| | | |
|---|---|---|
| 1049682 | 2/1979 | Canada . |
| 3-203123 | 4/1991 | Japan . |
| 4089850 | 3/1992 | Japan . |
| 5-098090 | 4/1993 | Japan . |
| 1062241A | 12/1983 | U.S.S.R. . |

*Primary Examiner*—Ralph H. Dean
*Attorney, Agent, or Firm*—Richard I. Gearheart

[57] ABSTRACT

There is disclosed a polyolefin composition which can be extruded at relatively high rates to provide extrudate having improved hydrophobicity, said composition comprising (A) 100 parts by weight of a thermoplastic resin; and (B) at least 1 part by weight of an interactive diorganopolysiloxane process aid, said diorganopolysiloxane having a number average molecular weight of at least 10,000.

20 Claims, No Drawings

ORGANIC POLYMERS MODIFIED WITH SILICONE MATERIALS

FIELD OF THE INVENTION

The present invention relates to thermoplastic compositions. More particularly, the invention relates to compositions having improved hydrophobicity wherein an interactive diorganopolysiloxane is added to a thermoplastic resin.

SUMMARY OF THE INVENTION

It has now been found that, when a small quantity of a interactive diorganopolysiloxane is added to a thermoplastic resin considerably improved properties are obtained.

The present invention therefore relates to a composition comprising:

(A) 100 parts by weight of a thermoplastic resin selected from the group consisting of high density polyethylene, polypropylene, polybutene, polyisoprene, ethylene copolymers, polyamides, polyamines, and polyesters; and (B) at least 1 part by weight of an interactive diorganopolysiloxane, said diorganopolysiloxane having a number average molecular weight of at least 10,000.

These compositions exhibit surprisingly improved properties, such as improved hydrophobicity, better processability, better pourability, and improved hand.

DETAILED DESCRIPTION OF THE INVENTION

The thermoplastic resins that constitute the component (A) of the invention are preferably high density polyolefins, but can be other thermoplastic resins as well, such as nylons, polyesters, polystyrenes, polyurethanes and acrylic resins, among others. As used herein, the term "thermoplastic resin" is meant to include those polymers which soften when exposed to heat and then return to original condition when cooled to room temperature. In the case where the thermoplastic resin is a polyolefin, it may be selected from homopolymers of olefins as well as interpolymers of one or more olefins with each other and/or up to about 40 mole percent of one or more monomers which are copolymerizable with the olefins. Examples of suitable polyolefins include homopolymers of propylene, butene-1, isobutylene, hexene, 1,4-methylpentene-1, pentens-1, octene-1, nonene-1 and decene-1, inter alia. Interpolymers of two or more of the above mentioned olefins may also be employed as component (A) and they may also be copolymerized with, e.g., vinyl or diene compounds or other such compounds which can be copolymerized with the olefins.

Specific examples of suitable interpolymers are ethylene-based copolymers, such as ethylene-propylene copolymers, ethylene-butene-1 copolymers, ethylene-hexene-1 copolymers, ethylene-octene-1 copolymers, ethylene-butene-1 copolymers and interpolymers of ethylene with two or more of the above mentioned olefins.

Component (A) may also be a blend of two or more of the above mentioned homopolymers or interpolymers. For example, the blend can be a uniform mixture of one of the above systems with one or more of the following: polypropylene, high pressure, low density polyethylene, high density polyethylene, polybutene-1 and polar monomer-containing olefin copolymers such as ethylene/ acrylic acid copolymers, ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers and ethylene/acrylic acid/vinyl acetate terpolymers, inter alia.

Preferably, these systems have a density of about 0.85 to 0.97 g/cc, more preferably 0.875 to 0.930 g/cc, and weight average molecular weight of about 60,000 to about 200,000.

The above polymers are well known in the art and further description thereof is considered unnecessary.

The diorganopolysiloxane (B) of the present invention is a interactive diorganosiloxane, having a number average molecular weight (Mn) of at least about 10,000, but preferably below about 1,000,000. Preferably, the Mn of component (B) is about 40,000 to about 400,000, more preferably about 75,000 to about 400,000.

It is contemplated that many of the compositions of the present invention will be processable in conventional extrusion equipment. When the compositions are to be extruded, the molecular weight of component (B) will influence the processing characteristics of the composition. When the molecular weight is below about 10,000 the compositions tend to exhibit excessive screw slip, i.e., lower output than expected for a given RPM of an extruder. Furthermore, at the lower molecular weights there is a marked decrease in extruder output when the compositions are extruded a second time. Such a second extrusion is often required in industrial operations. For example, errors in manufacture, such as incorrect extruder settings or omission of/insufficient amount of key ingredients, necessitate re-extrusion of the resulting "off-spec" material. Likewise, in film blowing operations, the edge portions of a flattened bubble are trimmed and recycled into the extruder. Further, re-extrusion is employed when scrap is returned and recycled, this procedure being known as "post-consumer recycle" in the art. On the other hand, when the molecular weight is above about 1,000,000, mixing the diorganopolysiloxane into the thermoplastic becomes difficult, but such a siloxane could still be employed.

Also critical to the practice of the present invention is the type of extruder die used in the extrusion process. In order to practice the present invention it is necessary to extrude or inject the composition through a metal die. The most preferred die is made from stainless steel, although chromium, nickel and platinum dies can also be used. It is not required that the metal be solid chromium or platinum; the die may be plated. The use of a metal die is critical to obtaining the desired properties of the invention. The metal die attracts the interactive groups of the polydiorganosiloxane, causing the polydiorganosiloxane to migrate toward the die. As a result the polydiorganosiloxane collects and concentrates at the surface of the cooled thermoplastic, giving the film improved properties, such as better hydrophobicity, better pourability and better hand.

It is preferred that component (B) is a gum having Mn in the approximate range of 100,000 to about 1,000,000 and most preferably about 75,000 to about 450,000. Component (B) may be a linear or branched polymer or copolymer wherein the organic groups are independently selected from methyl or phenyl radicals.

Suitable diorganopolysiloxanes include polydimethylsiloxane homopolymers, copolymers consisting essentially of dimethylsiloxane units and methylphenylsiloxane units, copolymers consisting essentially of dimethylsiloxane units and diphenylsiloxane units, copolymers consisting essentially of diphenylsiloxane units and methylphenylsiloxane units, and homopolymers of methylphenylsiloxane units. Mixtures of two or more such polymers or copolymers may be employed as component (B).

For the purposes of the present invention the diorganopolysiloxane (B) must contain at least 1, but preferably 2 or more, interactive groups in the molecule, such as hydroxyl, carboxylic acid, nitrogen, alkylenyl groups. As used herein the term "interactive" refers to the tendency of the group to attracted to a metal surface, such as extrusion die. Most preferred are hydroxyl groups. The interactive groups may be located at the ends of the molecule, or they may be distributed along the chain or they may be located both at the ends as well as along the chain. Preferably, the interactive groups reside at the molecular chain ends, as in the case of hydroxyl, in the form of diorganohydroxysiloxy groups, such as dimethylhydroxysiloxy, diphenylhydroxysiloxy, and methylphenylhydroxysiloxy, inter alia. When the interactive groups are located only along the chain, the terminal groups of the diorganopolysiloxane may be any non-reactive moiety, typically a di or triorganosiloxy species such as dimethylvinylsiloxy or trimethylsiloxy.

It is preferred that the diorganopolysiloxane (B) is a linear polydimethylsiloxane containing up to about 50 mole percent of methyl radicals. Most preferably, it is a polydimethylsiloxane homopolymer having dimethylhydroxysiloxy end groups.

The compositions of the present invention are prepared by thoroughly dispersing at least 1 part by weight of diorganopolysiloxane (B) in 100 parts by weight of thermoplastic (A). Higher amounts of component (B) (up to 50 parts) can be used to form a masterbatch of the composition for further processing. For finished products, it is preferred that about 1 to about 5 parts by weight of component (B) are used for each 100 parts by weight of component (A). More preferably, about 1 to 4 parts of (B), and most preferably about 1 to 3 parts, per 100 parts by weight of (A) are used. When the diorganopolysiloxane is added at levels below about 1 part per 100 parts by weight of (A), there is little significant improvement in the contact angle versus the corresponding unmodified polyolefin, particularly at high rates of extrusion or injection. Similarly, at levels higher than about 10 parts of (B) per 100 parts by weight of (A), the surface quality of the cooled thermoplastic again begins to deteriorate. Furthermore, when more than about 10 parts of (B) per 100 parts by weight of (A) is used, an excessive amount of siloxane is observed on the surface of the extrudate which adversely impacts such properties as printability and sealability. Additionally, the physical properties of the final extrudate are degraded. Thus, the above recited preferred compositional ranges result in the desired balance of good contact and hydrophobicity as well as low screw slip during processing, particularly at high extruder output rates.

The dispersion of diorganopolysiloxane (B) into polyolefin (A) may be accomplished by any of the traditional means for mixing additives into thermoplastic resin at elevated temperature. For example, the two components may be blended in a twin-screw extruder, a Banbury mixer, a two-roll mill or a single-screw extruder, either with or without a mixing head. The equipment used to mix these component is thus not critical as long as a uniform dispersion of (B) in (A) is attained. Preferably the dispersed particle size is no larger than about 10 micrometers.

In addition to the above components, compositions of the present invention may also contain up to about 1 percent by weight of each of the following: fillers, cure agents, lubricants, u.v. stabilizers, antioxidants, antiblock agents, catalyst stabilizers and other process aids commonly employed in the modification of polyolefins. When more than about 1 weight percent of any of these additional ingredients is used, there is interference with the process aid of the present invention such that the above described benefits in processing and/or the character of the resulting extruded materials are not optimal. This is particularly critical in the case of blown film production, where good surface quality is crucial. Moreover, up to 15% by weight of their total composition of the present invention could be an antiblock agent.

Specific non-limiting examples of the above additional ingredients include the following substances. Diatomaceous earth, octadecyl-3-(3,5-di-5-butyl 4-hydroxyphenyl)-propionate, bis(2-hydroxyethyl) tallowamine, calcium stearate, N,N-bis(2,2,6,6-tetramethyl-4-piperidinyl)-1,6-hexanediamine polymer with 2,4,6-trichloro-1,3,5-trizaine and 2,4,6-trichloro-1,3,5-trizaine and 2,4,4-trimethyl 1,2-pentanamine, dimethyl succinate polymer with 2,2,6,6-tetramethyl-1-piperridineethanol, 2,2-thiobis)4-tert-octylphenolato]n-butylamine nickel, tris(2,4-di-tert-butylphenyl)phoshite, bis(2,4-di-t-butylphenyl) pentaerythritol diphosphite, trisnonylphenylphospite, polyethylene glycol, Erucamide, titanium dioxide, titanium dioxide, alumina, hydrated alumina, talc, 2-hydroxy-4-n-octyloxy-benzophenone, silicone dioxide, zinc oxide, zinc sulfide and zinc stearate.

According to the method of the present invention, the above described diorganopolysiloxane (B) is added to the thermoplastic resin (A) and serves as a process aid therefor when the resin is extruded at elevated temperatures to form a shaped product (e.g., a cylindrical cross-section, such as a film, ribbon, bar, annulus, fiber, sheet, bottles, trays, jugs or the like). The resulting extrudate has an improved hydrophobicity relative to a similar extrudate which does not contain diorganopolysiloxane (B). This method is particularly applicable to the production of cast film or blown film, but also finds utility in extrusion blow molding; injection molding; pipe, wire, or cable extrusion; fiber production; and any similar high shear melt processing of polyolefin resins, all of these techniques being well known in the art. Briefly stated, blown film is typically produced by a "bubble" technique, wherein the polyolefin composition (i.e., the melt) is extruded through an annular die to form a film in the shape of a bubble. This bubble is withdrawn from the die at a rate greater than the rate of extrusion, while a positive air pressure is maintained within the bubble. Film produced in this manner is biaxially oriented as a result of stretching in the radial and axial directions and this orientation generally imparts improved mechanical properties to the film. Cast film is generally prepared by extruding the polyolefin through a slot die followed by cooling on one or more chill rolls. In the case where the composition is injection molded, the die must also be metal, or the mold into which the thermoplastic is injected is made of metal, such as stainless steel, or plated with chromium, nickel or platinum among others.

Although it is possible to obtain a relatively uniform dispersion by injecting component (B) into the screw section of an extruder while polyolefin pellets are fed in through the hopper thereof, it is preferred to first thoroughly disperse component (B) in a portion of component (A) to form a masterbatch. This masterbatch (or concentrate), which preferably contains about 1 to 50, more preferably 20 to 50, weight percent of the diorganopolysiloxane, may be ground up or pelletized, the resulting particulate dry-blended with additional thermoplastic (the matrix) and this blend then extruded or injected to form a composition of the invention. Use of this masterbatch technique results in a more uniform dispersion of the diorganopolysiloxane in the thermoplastic matrix.

The thermoplastic used in the preparation of the above described masterbatch may be the same as, or different from, the matrix thermoplastic resin. Preferably, the two are of the same general type (e.g., polypropylene in the masterbatch and in the matrix).

The modified thermoplastic resins of the present invention show a variety of improved properties. For example it is believed by the inventor that the interactive groups of the polysiloxane are attracted to the metal die of the extruder or injection molding apparatus, causing the polysiloxane to migrate to the surface of the thermoplastic. The migration of the polysiloxane to the surface of the thermoplastic gives the surface of the thermoplastic improved properties, such as improved hydrophobicity and pourability. Thus, films and shaped articles such as bottles or other containers made from the invention have better hydrophobicity and/or pourability.

Moreover, the congregation of silicone at the surface of the thermoplastic gives the thermoplastic an improved "hand". This property is important where the thermoplastic is polypropylene and it is used to produce a non-woven fiber, where the sensory and tactile characteristics of the fibers are important.

The compositions of the present invention can therefore be further subject to a further process step, all of which are well known in the art, such as but not limited to injection molding, injection blow molding, extrusion blow molding, blown film processes, cast film processes, profile extrusion, rotational molding, compression molding, transfer molding, theromforming and calandaring.

In addition, adding the polyorganosiloxane of the present invention also improves the process efficiency of the thermoplastic.

These improved properties are illustrated by the examples below.

EXAMPLES

The following examples are presented to further illustrate the compositions and method of this invention, but are not to be construed as limiting the invention, which is delineated in the appended claims. All parts and percentages in the examples are on a weight basis and all measurements were obtained at about 25° C., unless indicated to the contrary.

CONTACT ANGLE—Measurements

The contact angle between a drop of specified liquid and a specified substrate is determined using a goniometer which measures the angle of the tangency of the drop profile to the surface. The material tested may be either the liquid or the substrate. In the following examples, distilled water was used and the substrates varied. The observed angle is reported in degrees along with the identity of both the liquid and substrate. This method is similar to ASTM D 724.

To make the measurements, the optical bench of the goniometer was leveled. The specified substrate was placed on the support stage and secured. The stage was adjusted so that the substrate or film could be clearly viewed through the microscope or video camera. A drop (2.5 mm in diameter) was placed on the substrate by making direct liquid to surface contact. The liquid was not dropped on the surface or otherwise distorted during placement. The illuminator was adjusted to optimum level and the microscope focused on the dark drop silhouette against a lighter background. The angle of tangency on both the left-hand and right-hand solid/liquid interface on the drop was measured and reported. The procedure was repeated three times and the average value reported to the nearest degree.

MATERIALS

The following materials were employed in the examples.

HDPE=a high density polyethylene having a density of 0.923 g/cc and marketed as DMDH™ 6147 by Nova Chemical (Lemester, Mass.).

Nylon 6=Capron™ 8202 Allied Signal, (Mt. Morris, N.Y.).

Polyester Terephthalate=0.64 IV PET Wellman, Inc., (Columbia, S.C.).

Example 1

A hydroxyl terminated polydimethylsiloxane having a molecular weight of $2.5 \times 10^7$ was compounded in HDPE, PET and Nylon then injection molded into panels and tested for hydrophobicity. The following procedures were used.

The mixtures were compounded by thoroughly mixing the HDPE, PET or Nylon and the siloxane at elevated temperature, on a Haake Rheocord™ 90 system twin-screw extruder (Haake—Paramus, N.J.), equipped with a Leistritz Micro 18 corotating twin screw extruder having a L/D (Length/Diameter) of 40/1 with the screw diameter of 18 mm. Temperatures of the four zones of each chamber of the extruder were set according to the thermoplastic resin, as set forth in Table 2 below.

TABLE 2

|  | HDPE | PET | NYLON 6 |
| --- | --- | --- | --- |
| Zone 1 | 230° C. | 250° C. | 250° C. |
| Zone 2 | 255° C. | 250° C. | 260° C. |
| Zone 3 | 255° C. | 250° C. | 260° C. |
| Zone 4–8 | 255° C. | 250° C. | 270° C. |

In the case of the HDPE example, sufficient siloxane was added to LDPE so that the total concentration of the silicone was about 25% by weight of the total composition weight. For the PET and Nylon examples, sufficient siloxane was added to same polymers so that the total concentration of silicone was about 10% by weight. These "masterbatch" compositions were extruded through a strand die and chopped into pellets upon cooling in a water bath.

The masterbatch pellets made according to the procedure above were then recompounded on the Haake Rheocord™ 90 system twin-screw extruder, this time adding sufficient thermoplastic resin to make compositions having 0.5%, 1.0% and 2.5% by weight of silicone. This procedure was repeated for each of the thermoplastic resins, HDPE, PET and Nylon. This resulted in pellets having 0.5%, 1.0% and 2.5% by weight of silicone for each thermoplastic resin, PET and Nylon, and 1.0% of silicone for HDPE. These compositions were then used to injection mold the panels ultimately tested for hydrophobicity.

The 4×4×⅛ inch panels referred to below were produced in an Arburg 35 ton clamp rating injection molding machine having a general purpose single screw having a 15/1 L/D with a screw diameter of 30 mm and a screw compression ration of 2/1. There are 3 heating zones, a heated nozzle (tip size=2 mm) and a heated mold cavity to make the 4×4×⅛ inch panels. The temperatures change relative to the plastic material being molded, the temperature of each zone being noted below.

TABLE 3

|  | HDPE | PET | Nylon 6 |
|---|---|---|---|
| Zone 1 | 230° C. | 250° C. | 250° C. |
| Zone 2 | 255° C. | 250° C. | 260° C. |
| Zone 3 | 255° C. | 250° C. | 260° C. |
| Nozzle Temp | 260° C. | 250° C. | 255° C. |
| Mold Temp | 150° F. | 160° F. | 170° F. |

The pellets were added to the injection molding machine and injected into 4×4×⅛ inch panels for each particular weight percent silicone and each thermoplastic. Ten panels were made for each thermoplastic and each weight percent silicone and the water contact angle measured on each.

The average water contact angle and standard deviation of the ten panels are shown in Tables 4, 5 and 6 below.

TABLE 4

HDPE DMDH 6147
Water Contact Angles

|  | 100 HDPE | 1.0 % |
|---|---|---|
| Average | 111.0 | 115.7 |
| STD | 0.9 | 2.1 |
| Variance | 0.9 | 4.5 |

TABLE 5

Polyester
Water Contact Angles

|  | 100% PET | 0.5% SGM-36 | 1.0% SGM-36 | 2.5% SGM-36 |
|---|---|---|---|---|
| Average | 101.8 | 102.3 | 106.2 | 105.3 |
| STD | 1.3 | 2.6 | 2.2 | 1.7 |
| Variance | 1.7 | 6.7 | 4.8 | 2.9 |

TABLE 6

Nylon 6 Allied Signal 8202 NL
Water Contact Angles

|  | 100% Nylon | 0.5% | 1.0% | 2.5% |
|---|---|---|---|---|
| Average | 67.3 | 71.1 | 77.1 | 71.9 |
| STD | 1.5 | 1.4 | 3.1 | 2.8 |
| Variance | 2.2 | 1.9 | 9.9 | 7.7 |

In the case of high density polyethylene (see Table 4) the panel showed a 4% improvement in hydrophobicity over the film test without the additive. Likewise, polyester (Table 5) showed an improvement of of up to 4% in hydrophobicity, again depending on the amount of additive added. In the case of the nylon panels (Table 6), the addition of the additive showed an improvement in hydrophobicity of from 5% to 13% depending on the amount of SGM-36 added. Improvements in hydrophobicity of less than 3% are not considered significant.

Example 2

The following examples demonstrates the surface segregation phenonmenon of the present invention, i.e., the migration of the hydroxyl terminated siloxane to the surface of the film.

A masterbatch of a hydroxyl terminated dimethylsiloxane having a viscosity of $2.5 \times 10^7$ cp. and a molecular weight of 400,000 was prepared by thoroughly mixing the siloxane and with polypropylene at elevated temperature. The particular masterbatches (MB) were prepared on a Haake Rheocord™ 90 system twin-screw extruder (Haake—Paramus, N.J.), equipped with a Leistritz Micro 18 corotating twin screw extruder having a L/D (Length/Diameter) of 40/1 with the screw diameter of 18 mm. Temperatures of the eight zones of each chamber of the extruder were set at 220° C. In each case, the masterbatch composition was extruded through a strand die and chopped into pellets upon cooling in a water bath.

The above masterbatch was thoroughly dispersed in a polypropylene matrix and pellets were produced by extrusion. The amount of masterbatch used was calculated so as to give a total silicone concentration of 2.5% by weight of polypropylene in the mixture. After compounding in the twin screw extruder, the pellets were placed in a Blown Film Extruder from Davis Standard model KL-075 ¾ inch floor model extruder, L/D 24/1 having 3 heating zones at 220 C. A circular 2.5 inch diameter Stainless Steel die maintained at 220 C was used to create the bubble. The air pressure inside the bubble was set such that the blow up ratio was 2 thus creating a 5 inch "lay flat" tube of film. The air ring used room air to blow around the bubble to cool and crystallize the film. The collapsing gate and pinch roll system allowed the film to be collected.

Samples were prepared for ESCA by cutting film squares ca. 1×1 cm² and mounting them on a multi-sample stage.

The results of the analysis are given below in atomic percent. The percent of the surface composition (excluding hydrogen) was measured to a depth of about 50 angstrome. The area anaylzed on each sample was about 800×300 microns. Each sample was examined at one position. Survey spectra and multiplex (detail) oxygen, carbon and silicone spectra were taken on each sample.

Virgin polypropylene had oxygen at 0.03%, carbon at 99.97% and silicon at 0.0%. Film made as described above had oxygen at 0.4%, carbon at 98.6%, and silicon at 0.2%. The measurements show a significant amount of silicone at the surface of the modified polypropylene film. Moreover, the polypropylene film had an excellent "hand", with very silky tactile properties.

Example 3

This example demonstrates that using the additive of the present invention improves the processing efficiency of the thermoplastic by reducing the amount of energy per unit time required to process a given quantity of extrudate A masterbatch a hydroxyl terminated dimethylsiloxane having a molecular weight of $2.5 \times 10^7$ cp. and a molecular weight of 400,000 in high density polyethylene, (HDPE) was prepared by thoroughly mixing the siloxane and the thermoplastic at elevated temperature. The particular masterbatches (MB) were prepared on a Haake Rheocord™ 90 system twin-screw extruder (Haake—Paramus, N.J.), equipped with a Leistritz Micro 18 corotating twin screw extruder having a L/D (Length/Diameter) of 40/1 with the screw diameter of 18 mm. Temperatures of the eight zones of each chamber of the extruder were set at 170° C. for Zone 1, and 185° C. for all others. The masterbatch composition was extruded through a strand die and chopped into pellets upon cooling in a water bath.

The above masterbatch was thoroughly dispersed in a HDPE matrix. The amount of masterbatch used was calculated so as to give a total silicone concentration of 2%, 6% and 10% in the HDPE. Unmodified virgin HDPE was also tested as a control.

The extruder used was a Battenfeld Fischer VK 1.1, o2 bottle blow moulder with a Reco coextrusion system. The line had two extruders, 25 mm core, 35 mm skin, capable of approximately 40Kg/hr output at maximum rpm of 120 and 150 bar. Each extruder had mixing pegs and a Maddox mixer and a Spiral die.

During the extrusion, extruder amperage (i.e., power consumption), pressure near the die (in bars) and extrudate output (in feet/minute) were recorded as a function of extruder speed (revolutions per minute=RPM.) The results of the amperage and pressure tests are set forth below in Table 4.

TABLE 7

| Amount SI | Extruder Amperage | Pressure (bar) |
|---|---|---|
| 0% | 9.8 | 155.2 |
| 2% | 5.6 | 155.5 |
| 6% | 4.2 | 149.1 |
| 10% | 4.3 | 145.3 |

The above results show that addition of the additive improves the efficiency of the extrusion by roughly 50%, without a reduction or significant change in the extrusion pressure.

That which is claimed is:

1. A composition comprising:
   (A) 100 parts by weight of a thermoplastic resin selected from the group consisting of high density polyethylene, polypropylene, polybutene, polyisoprene, ethylene copolymers, polyamides, polyamines, and polyesters; and
   (B) 1 to 5 parts by weight of an interactive diorganopolysiloxane having a number average molecular weight of at least 10,000 wherein said interactive diorganopolysiloxane has at least one pendant or terminal interactive group selected from the group consisting of hydroxyl groups, amine groups, and vinyl groups.

2. The composition according to claim 1, wherein said diorganopolysiloxane (B) is a linear hydroxy-terminated polydimethylsiloxane and said thermoplastic resin (A) is high density polyethylene or polypropylene.

3. The composition according to claim 1, wherein said thermoplastic resin (A) is blended with a polyethylene.

4. The composition according to claim 1, wherein the number average molecular weight of said polydimethylsiloxane (B) is 100,000 to 1,000,000, and said component (B) is hydroxyl terminated.

5. The composition of claim 1, wherein the interactive group is a terminal hydroxy group.

6. The composition of claim 1, wherein said diorganopolysiloxane (B) is a hydroxy terminated polydimethylsiloxane.

7. Shaped products of the composition according to claim 1.

8. Shaped products of the composition according to claim 6.

9. In a method of processing a thermoplastic resin in which a process aid is added to the thermoplastic resin to facilitate processing thereof, the improvement comprising adding as the process aid 1 to 5 parts of an interactive diorganopolysiloxane having a number average molecular weight of at least 10,000, wherein said interactive diorganopolysiloxane has at least one pendant or terminal interactive group selected from the group consisting of hydroxyl groups, amine groups, and vinyl groups, and processing the resin through a metal die, whereby the resulting thermoplastic resin exhibits an improved degree of hydrophobicity relative to the unmodified thermoplastic resin, and said thermoplastic resin is selected from the group consisting of high density polyethylene, polypropylene, polybutene, polyisoprene, ethylene copolymers, polyamides, polyamines, and polyesters.

10. The method according to claim 9, wherein the number average molecular weight of said polydiorganosiloxane hyroxyl terminated polydimethylsiloxane is 75,000 to 400,000. and from 0.1 to 5 parts by weight of said polydimethylsiloxane is used for each 100 parts by weight of said thermoplastic resin (A).

11. In a method of processing a thermoplastic resin in which a process aid is added to the thermoplastic resin, the improvement comprising adding a process aid which is a uniform blend of
   (i) 1 to 5 parts of an interactive diorganopolysiloxane having a number average molecular weight of at least 10,000 wherein said interactive diorganopolysiloxane has at least one pendant or terminal interactive group selected from the group consisting of hydroxyl groups, amine groups, and vinyl groups; and
   (ii) a thermoplastic resin selected from the group consisting of high density polyethylene, polypropylene, polybutene, polyisoprene, ethylene copolymers, polyamides, polyamines, and polyesters to
   (iii) an additional quantity of said thermoplastic resin, whereby the resulting processed thermoplastic resin is processed through a metal die, and the processed resin exhibits improved hydrophobicity relative to the unmodified thermoplastic resin.

12. The method according to claim 11, wherein said diorganopolysiloxane is a linear hydroxy-terminated polydimethylsiloxane.

13. The method according to claim 9, wherein the resulting processed thermoplastic resin is subjected to a film blowing step.

14. The method according to claim 9, wherein the resulting processed thermoplastic resin is subjected to a cast film step.

15. The method according to claim 9, wherein the resulting processed thermoplastic resin is injection molded.

16. The method according to claim 11, wherein the resulting processed thermoplastic resin is subjected to a film blowing step.

17. The method according to claim 11, wherein the resulting processed thermoplastic resin is subjected to a cast film step.

18. The method according to claim 11, wherein the resulting processed thermoplastic resin is injection molded.

19. The method according to claim 9, wherein the resulting processed thermoplastic resin is subjected to a further step, wherein said further step is selected from the group consisting of injection molding, injection blow molding, extrusion blow molding, blown film processes, cast film processes, profile extrusion, rotational molding, compression molding, transfer molding, theromforming and calendering.

20. The method according to claim 11, wherein the resulting processed thermoplastic resin is subjected to a further step, wherein said further step is selected from the group consisting of injection molding, injection blow molding, extrusion blow molding, blown film processes, cast film processes, profile extrusion, rotational molding, compression molding, transfer molding, theromforming and calendering.

* * * * *